(12) United States Patent
Jain et al.

(10) Patent No.: US 7,940,457 B2
(45) Date of Patent: May 10, 2011

(54) ENERGY-EFFICIENT OPTOELECTRONIC SMART WINDOW

(75) Inventors: Kanti Jain, Urbana, IL (US); Linus Jang, Champaign, IL (US); Yoon Soo Han, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 5 days.

(21) Appl. No.: 12/201,522

(22) Filed: Aug. 29, 2008

(65) Prior Publication Data

US 2009/0296188 A1 Dec. 3, 2009

Related U.S. Application Data

(60) Provisional application No. 61/057,617, filed on May 30, 2008.

(51) Int. Cl.
*G02B 5/18* (2006.01)
*G02B 27/44* (2006.01)
*G02F 1/1335* (2006.01)

(52) U.S. Cl. ........ 359/566; 359/568; 359/572; 359/573; 359/271; 359/275; 349/16; 349/201; 349/202; 362/558; 362/559

(58) Field of Classification Search .................... 349/16, 349/201, 202; 385/146, 147; 362/558, 559; 359/271, 275, 566, 568, 572, 573
See application file for complete search history.

(56) References Cited

U.S. PATENT DOCUMENTS

| | | | | |
|---|---|---|---|---|
| 4,639,091 A | * | 1/1987 | Huignard et al. | 349/202 |
| 4,850,682 A | * | 7/1989 | Gerritsen | 349/201 |
| 4,964,701 A | * | 10/1990 | Dorschner et al. | 349/202 |
| 5,151,814 A | | 9/1992 | Grinberg et al. | |
| 6,014,845 A | | 1/2000 | Jain et al. | |
| 6,094,306 A | | 7/2000 | Jain | |
| 6,172,792 B1 | | 1/2001 | Jepsen et al. | |
| 6,404,553 B1 | | 6/2002 | Wootton et al. | |

(Continued)

FOREIGN PATENT DOCUMENTS

EP 1 767 964 3/2007

OTHER PUBLICATIONS

Carl, M.L. (2001) "Progress in Switching Windows," *Solar Switch. Mater. Proc. SPIE* 4458:95-103.

(Continued)

*Primary Examiner* — Evelyn A. Lester
(74) *Attorney, Agent, or Firm* — Greenlee Sullivan P.C.

(57) ABSTRACT

In an aspect, described herein is a dynamically controllable optoelectronic smart window which utilizes a diffraction grating for selective transmission or rejection of a specific region of the electromagnetic spectrum, for example the infrared, near-infrared and/or visible regions. Window embodiments described herein may further utilize a selectively controlled and/or patterned total internal reflection layer to assist with the selective rejection of a specific spectral region while allowing for transmission of another specific spectral region. In another aspect, the present invention provides methods for dynamically controlling the transmission or rejection of solar near-infrared and/or visible radiation.

80 Claims, 11 Drawing Sheets

U.S. PATENT DOCUMENTS

| | | |
|---|---|---|
| 6,587,180 B2 | 7/2003 | Wang et al. |
| 7,075,615 B2 | 7/2006 | Ishihara et al. |
| 7,262,899 B2 | 8/2007 | Bigman |
| 2002/0015230 A1 | 2/2002 | Pilossof et al. |
| 2005/0232530 A1 | 10/2005 | Kekas |
| 2007/0036512 A1 | 2/2007 | Winston et al. |
| 2008/0030836 A1 | 2/2008 | Tonar et al. |

OTHER PUBLICATIONS

International Search Report and Written Opinion, Corresponding to International Application No. PCT/US09/45474, Mailed Jul. 27, 2009.

Wang et al. (Dec. 10, 2000) "Liquid-Crystal Blazed-Grating Beam Deflector," *Appl. Optics* 39(35):3545-3555.

* cited by examiner

ENERGY-EFFICIENT OPTOELECTRONIC SMART WINDOW

CROSS REFERENCE TO RELATED APPLICATION

This application claims priority under 35 U.S.C. 119(e) to U.S. Provisional Patent Application No. 61/057,617 filed on May 30, 2008, which is hereby incorporated by reference in its entirety to the extent not inconsistent with the disclosure herein.

STATEMENT REGARDING FEDERALLY SPONSORED RESEARCH OR DEVELOPMENT

Not Applicable.

BACKGROUND OF THE INVENTION

This invention is generally related to maximizing window efficiency and enabling control of the transmission of solar radiation into the interior of a building. This invention more specifically relates to advanced smart windows for high energy efficiency and recycling capability which include a diffraction grating for separation of different spectral regions for selective rejection and/or transmission of infrared, visible and ultraviolet radiation into the interior of a building. This invention also relates to a smart window having a selectively patterned micro cell array that aids in reflecting incident light having a specific range of wavelengths, dispersed by a diffraction grating, from the solar spectrum.

White light from the sun has a broad range of wavelengths. Among them, visible rays with wavelengths ranging from 0.4 µm to 0.7 µm are always useful to humans, while infrared rays with wavelengths ranging from 0.7 µm to 3.0 µm are only useful for some seasons. Approximately 40% of total solar flux lies in the infrared spectral region. In the summer season, it is frequently desired to reject the entry of solar heat into a building to reduce the building cooling costs, whereas in winter season it is desirable to permit the solar IR radiation to enter the building to reduce the heating costs. The function of conventional energy saving window technologies is currently confined to simply blocking the solar radiation without considering the wavelength of the incident light, so this leads to a need for extra interior lighting even in daylight hours.

From an optics perspective, conventional windows are classified as passive devices that function depending upon inherent characteristics of the glass and polymeric materials of which they are constructed. With conventional windows, mechanical methods are generally used to physically block direct solar radiation. Typical examples include awnings, louvers, blinds, etc. which usually have a fixed construction but can be made adjustable or retractable in response to changes in solar radiation direction. Louvers and blinds are typically composed of slats varying in size, width, and shape depending on the application. They are mainly intended for shading, but can also be used to redirect daylight, reduce glare, and control solar heat gain. Fixed mechanical systems are usually available at a low cost, but controllable mechanical systems can be more expensive. A major drawback is that mechanical methods typically block daylight when only heat-blocking is desired.

Passive optical methods have also been utilized for redirecting daylight, reducing glare, and controlling solar heat gain. Spectrally selective coatings applied to window glass typically reject a specific fraction of the solar spectrum, generally ultraviolet and infrared radiation, while admitting visible radiation. In this way, such a coating can allow visible light to be transmitted through a window, but blocks heat-generating ultraviolet and/or infrared radiation. Spectrally selective coatings are typically composed of thin metal films or a dielectric-metal multilayer which is coated or applied to the glass window. Such coatings can reduce solar heat gain, and thus directly benefit buildings situated in hot climates where the cooling load is a major energy cost. They can also be applied inside of a building to reduce heat loss through the windows in cold climates but will also block incoming heat from direct daylight, which is an important natural heating source. This technology, however, is not ideal for use in mixed climates because the coating property is fixed once it has been applied to the window.

A smart window, however, is an active device which can control optical transmittance by application of a set of electric signals. Various active window systems exist, all of which have major limitations. For example, one technical approach for smart windows is mainly limited to changing only one optical property, transmittance, for all ranges of wavelengths.

A photochromic window is one example of such a smart window. Photochromic windows experience a photochemical reaction under exposure to solar radiation in a specific spectral range, usually UV. This reaction changes the optical absorption band of the window, which is originally transparent to visible radiation, resulting in a change of color. The reaction can be reversed by eliminating the light source that has activated the transformation. The optical transparency is automatically varied with the intensity of the incident light. Such a window has the weakness that it can work only depending on the intensity of the external light, thereby not meeting seasonal requirements; for example, in summer months it blocks infrared radiation as well as useful visible light. Photochromic technology is widely known for its use in sunglass lenses.

Similarly, thermotropic or thermochromic windows change their optical properties in response to a temperature change. In general, they are transparent at lower temperatures and become translucent or opaque at higher temperatures. The basic mechanism is based on the movement of the component molecules to cause a phase change in the material, which scatter light accordingly. The major commercial applications of these materials are skylights and upper windows where visual comfort can be ignored.

Photochromic, thermotropic, and thermochromic windows are self-regulating, which make them less useful as energy saving devices since they can not be manually controlled to respond to the changing environment. Their optical properties can change when exposed to UV radiation and/or altered temperature. Photochromic materials will block heat on a sunny cold winter day, and thermotropic materials will block visible light on a warm summer day.

Active materials, such as those used in liquid crystal displays have an advantage over the use of photochromic and thermochromic materials in smart windows since they are electrically programmable and switchable. Commercially available liquid crystal displays are typically composed of two polarized glass substrates with a liquid crystal region between them and have transparent oxide electrodes. The first glass substrate is polarized in one direction and the second one is polarized in a perpendicular direction. In the off state, the liquid crystal molecules rotate the polarization of the light by 90 degrees, allowing incident light to pass through the two glass substrates without optical loss. When an electric field is applied, the liquid crystals will align and no longer rotate the polarization of the incident light; thus, the display will be opaque.

A polymer dispersed liquid crystal (PDLC) material is another useful liquid crystal system; however, the liquid crystal structure used in PDLC smart windows is somewhat different from that of a liquid crystal display. In a PDLC smart window, an emulsion of a polymer and liquid crystal is formed into a film. The refractive index of the polymer matrix is matched to the dispersed liquid crystal. The film is then sandwiched between two transparent sheets which are coated with a transparent conducting material, such as Indium Tin Oxide (ITO). In the off state, randomly oriented liquid crystals scatter light, making the film translucent. When an electric field is applied, the dispersed liquid crystals align parallel to the field and change the film's transparency. These windows are suitable for privacy windows, as they do not sacrifice light; however, they cannot efficiently block heat. The lack of a memory effect requires continuous power to hold the window in a transparent state; therefore, the power consumption is ultimately higher than that of other materials which only require power during switching.

Suspended particle system (SPS) windows utilize a similar concept as PDLC windows except that they use light absorbing microparticles instead of scattering liquid crystals to make the window opaque. SPS windows have an active polymer layer where the light absorbing microparticles are suspended. This layer is sandwiched between two sheets coated with transparent conductors, for example ITO, with a dielectric layer on top. In the off state, the suspended particles are randomly distributed and absorb light, making the film opaque. By applying an electric field to the active layer through the transparent conductors, the particles align to the field and change the transparency of the film. An application similar to SPS is electrophoretic electronic paper, also know as E-ink, which utilizes the migration of color coated suspended particles under the influence of an applied electric field. Since heat and light are both absorbed, the major application of SPS windows is shading, and illumination may be required inside a building, increasing energy use.

Electrochromic windows are among the most technologically advanced window systems. Instead of using suspended particles or liquid crystals, electrochromic materials are typically composed of a stack of an electrochromic layer, a conducting electrolyte layer, and an ion storage layer, all of which are placed between transparent conductors, such as ITO. They are transparent in the off state, and optical properties of the electrochromic layer can be changed by the injection of coloration ions from the storage layer. An applied electric field drives ions from the storage layer through the conducting layer to the electrochromic layer, altering the electronic structure of the electrochromic layer. This reaction switches the window from the transparent state to the opaque state. A reverse electric field will draw the coloration ions back into the storage layer switching the electrochromic layer back to its original clear state. Various coloration ions such as $Li^+$, $H^+$, $Na^+$, and $Ag^+$ can be utilized. Inorganic oxides such as $WO_3$, $NiO$, $V_2O_5$, and $MoO_3$ can be used for the electrochromic layer, among which $WO_3$ has been most widely studied. Electrochromic windows only consume power during switching, require a low driving voltage (1-5V) and have long term memory (12-48 h), making this technology energy efficient. However, fabrication of large area windows is very expensive (~\$50-100/ft$^2$) and illumination is still required since the window absorbs or reflects the visible light.

Gasochromic materials share the principle of electrochromic materials except that the coloration ions are supplied by means of gas. Hydrogen ($H_2$) gas is typically injected between two panes, where one of the panes has a coating of a thin catalytic layer on top of a chromogenic layer, for example $WO_3$. Decoloration can be achieved by feeding another purging gas. The major drawback with this technique is the need of integration of gas lines into the window which is a large construction limitation.

SUMMARY OF THE INVENTION

The window technologies of the prior art that control transmittance through the windows suffer from one or more of the following limitations: inability to efficiently reject or accept solar heat as desired, blocking daylight when only heat-blocking is desired, very expensive, difficult to implement on large enclosures, and incapable of being optimized for different climactic conditions. An optoelectronic or smart window of embodiments of the present invention overcomes these limitations, leading to highly cost-effective, programmable window systems with greatly improved energy efficiency and recycling capability. Specific advantages of the windows of embodiments of the present invention include, but are not limited to:

(i) In controlling transmittance of the solar luminous flux into buildings, a window may efficiently separate the solar IR radiation from the visible radiation, allowing the IR radiation to be rejected by total internal reflection, without rejecting the visible daylight. The rejection of IR radiation reduces building air-conditioning costs; in addition, the transmission of visible radiation reduces energy costs for interior lighting.

(ii) In winter months, a window of an embodiment of the present invention can be easily switched to accept the solar IR flux, enabling savings in building heating costs.

(iii) A window of an embodiment of the present invention can be fabricated at a low cost in high volumes. A wide choice of industrially mature materials and processing technologies already exist that are suitable for producing and driving the pixel-by-pixel diffractive structure.

(iv) The dynamic programmability of a pixelated optoelectronic window system of an aspect of the present invention enables full optimization of the window transmittance, for example, for different times of day, different seasons, and/or different geographic locations.

The limitations of previous smart window designs are overcome in one aspect by implementing a programmable diffraction grating window. In a conventional grating, as illustrated in FIG. 1$a$, the strongest diffracted order is the (0)th order, around which the higher orders (+1, −1, +2, −2, etc.) are symmetrically dispersed with decreasing intensity. Since the (0)th order is along the optical axis for all wavelengths, a conventional diffraction grating cannot efficiently separate the infrared from the visible in the solar radiation. In a specific embodiment, a smart window comprises a blazed diffraction grating. A blazed grating is a special type of diffraction grating that allows the diffracted radiation in a given spectral region to be highly concentrated into a desired, specific, non-zero diffraction order (generally +1 or −1).

In another aspect, a smart window selectively rejects a specific spectral region by utilizing total internal reflection (TIR). Total internal reflection is an optical phenomenon that occurs when a ray of light strikes a boundary at an angle larger than the critical angle with respect to the normal to the surface. If the refractive index is lower on the other side of the boundary no light can pass through, and all of the light is effectively reflected. The waveguide and the optical fiber are two of the most well known applications of the TIR principle. An optical cable is composed of many optical fibers; the core material of the fibers has a higher refractive index and is wrapped with a cladding material with a lower relative index. The interface between the core-cladding structure acts as a highly reflecting mirror for oblique light, which has a higher angle of incidence than the critical angle, and signal loss can be minimized even for long distance travel.

In an embodiment, a smart window comprises: a first window pane having a first index of refraction; a second window pane having a second index of refraction; and a diffraction grating comprising an electro-optic material region having an electro-optic material, and wherein the electro-optic material region is positioned between the first and second window panes and has a selected spatial distribution of refractive indices. In a specific embodiment, the selected spatial distribution of refractive indices is electrically controllable. As used herein, electro-optic material refers to a composition of matter having one or more optical properties which can be adjusted by the strength of an applied voltage and/or electric field, for example the absorbance or refractive index. Electro-optic materials include liquid crystals, electro-optic polymers, electro-optic crystals, optical ceramics, piezoelectric materials, and other electro-optic materials known to the art.

In a specific embodiment, the electro-optic material comprises liquid crystals, for example nematic liquid crystals. In an embodiment, the orientation of the liquid crystals is electrically controllable. In a specific embodiment, the liquid crystals have a birefringence selected from the range of 0.15 to 0.30. As used herein, birefringence refers to the absolute value of the difference between the ordinary and extraordinary refractive indices for a material. In another embodiment, the electro-optic material comprises an electro-optic polymer or an optical ceramic. Useful electro-optic material regions may have a variety of thicknesses, for example a thickness selected from the range of 1 to 10 µm.

In a specific embodiment, the diffraction grating of a smart window is a blazed grating. In an embodiment, the blazed grating is optimized for acceptance of or rejection of the near-infrared spectral region, and for transmission of the visible spectral region through the first and second window panes. In an embodiment, the diffraction grating is transparent or has a transmittance above 50%. In a specific embodiment, the diffraction grating is transparent or has a transmittance above 50% for light having a wavelength between 0.3 and 3.0 µm.

In a specific embodiment, the diffraction grating further comprises electrodes on both sides of the electro-optic material region. For example, the electrodes may comprise a counter electrode on one side of the electro-optic material region and an array of signal electrode elements on the other side of the electro-optic material region. In an embodiment, a useful counter electrode comprises a transparent conductor. Counter electrodes useful with a window may also comprise or be utilized as a UV blocking layer. In an embodiment, the counter electrode comprises a transparent conducting oxide, for example Indium Tin Oxide (ITO) or Indium Zinc Oxide (IZO). In a specific embodiment, the counter electrode has a thickness selected from the range of 50 to 200 nm.

In an embodiment, an array of signal electrode elements is useful, for example, as such an array is capable of establishing a spatially periodic index of refraction within the electro-optic material region. Specifically, each signal electrode element may be independently electrically addressable. In an embodiment, the array of signal electrode elements comprises an array of transparent conductors, for example a transparent conducting oxide such as Indium Tin Oxide or Indium Zinc Oxide. In a specific embodiment, the array of electrode elements has a thickness selected from 50 to 200 nm.

In an exemplary embodiment, the array of signal electrode elements comprises a 1-dimensional array of signal electrode elements or a 2-dimensional array of signal electrode elements. In an embodiment, the array of signal electrode elements is capable of establishing a selected spatial distribution of refractive indices. In a specific embodiment, each signal electrode element within the array of signal electrode elements has a width selected from the range of 1 to 10 µm, and/or a length selected from the range of 1 to 10 µm. In a specific embodiment, the array of signal electrode elements has an inter element spacing selected from the range of 0.1 to 2 µm.

A voltage applied between the counter electrode and the signal electrode elements may, for example, change the orientation of the electro-optic material. Specifically, a voltage applied between the counter electrode and the signal electrode elements can change the index of refraction of the electro-optic material. For example, the electro-optic material region can have a spatially periodic index of refraction. For some embodiments, the spatial period is selected from the range of 1 to 100 µm. A specifically useful spatially periodic index of refraction has a sawtooth profile or a step-wise sawtooth profile.

In a specific embodiment, it is preferred that the first window pane and the diffraction grating are in optical communication and/or that the diffraction grating and the second window pane are in optical communication. In an embodiment, the index of refraction of the first window pane is selected from the range of 1.3 to 1.6. In an embodiment, index of refraction of the second window pane is selected from the range of 1.4 to 1.7. In a preferred embodiment, the index of refraction of the first window pane is smaller than the index of refraction of the second window pane. As used herein, optical communication refers to a configuration of two or more elements wherein one or more beams of electromagnetic radiation are capable of propagating from one element to the other element.

Light which passes through the first or second window pane is diffracted by the diffraction grating to generate diffracted light. In a preferred embodiment, at least a portion of the diffracted light undergoes total internal reflection in the second window pane. In an embodiment, a smart window comprises a total internal reflection layer positioned such that the second window pane is positioned between the diffraction grating and the total internal reflection layer. In another preferred embodiment, at least a portion of light incident on the total internal reflection layer undergoes total internal reflection.

Materials independently useful for the first and second window panes include, but are not limited to, various glasses and polymers selected from the group consisting of PVK, PPX, PEEK, PSU, PS, PC, PET, SAN, PVC, PVP, PE, EMA, PVA, MC, PMMA, CA, PEA, PVDF, PDMS, and PTFE. In an embodiment, the first and second window panes each independently have thicknesses selected from the range of 10 to 50 mm.

In an aspect, a window further comprises a microcell array positioned in optical communication with the diffraction grating. For example, the microcell array may be incorporated into the second window pane. In a preferred embodiment, at least a portion of light incident on the microcell array undergoes total internal reflection, for example infrared or near-infrared light.

A useful microcell array, for example, comprises a first material and second material. Materials independently useful for the first and second materials of the microcell array include, but are not limited to, various glasses and polymers selected from the group consisting of PVK, PPX, PEEK, PSU, PS, PC, PET, SAN, PVC, PVP, PE, EMA, PVA, MC, PMMA, CA, PEA, PVDF, PDMS, and PTFE. In a preferred embodiment, the first material and the second material have different indices of refraction.

In a specific embodiment, the microcell array comprises a plurality of microcell elements and an intercell region. For example, the microcell elements may comprise the first material and the intercell region may comprise the second material. In a specific embodiment, the microcell elements each have thicknesses selected from the range of 1 to 100 µm. In a specific embodiment, the microcell elements have lengths and/or widths selected from the range of 1 to 1000 µm. In a specific embodiment, the spacing between microcell elements is selected from the range of 1 to 1000 µm.

In an embodiment, the microcell elements are each surrounded on at least one side by the intercell region. For example, the microcell elements may each be surrounded on at least three sides by the intercell region or at least five sides by the intercell region. In a specific embodiment, the intercell region has a thickness selected from the range of 0 to 20 µm.

In an embodiment, a smart window comprises a UV blocking layer, a UV absorbing layer, a UV reflecting layer and/or a UV scattering layer, positioned in optical communication with the first window pane, the second window pane, or the diffraction grating. Such a layer is useful for protecting components of the window from damage by long term UV exposure, and/or useful for preventing entry of UV light into a building.

In another aspect, the present invention provides a method of dynamically controlling the transmission and/or rejection of solar near-infrared and/or visible radiation through a window. A method of this aspect comprises the steps of: providing a window comprising: a first window pane having a first index of refraction, a second window pane having a second index of refraction, and a diffraction grating between the first and second window panes, wherein the diffraction grating comprises an electro-optic material having a controllable spatial distribution of refractive indices; and dynamically controlling the spatial distribution of refractive indices of the electro-optic material, such that solar near-infrared and visible radiation incident on the window is transmitted or rejected as desired. Window panes useful with the methods of this aspect may independently comprise materials including, but not limited to, various glasses and polymers selected from the group consisting of PVK, PPX, PEEK, PSU, PS, PC, PET, SAN, PVC, PVP, PE, EMA, PVA, MC, PMMA, CA, PEA, PVDF, PDMS, and PTFE.

In a specific embodiment of a method of this aspect, the index of refraction of the first window pane is different from the index of refraction of the second window pane. In a method of this aspect the window further comprises a total internal reflection layer positioned such that the second window pane is positioned between the diffraction grating and the total internal reflection layer. For example, at least a portion of the solar near-infrared radiation incident on the total internal reflection layer undergoes total internal reflection. In a preferred embodiment, a majority of the solar near-infrared radiation incident on the total internal reflection layer undergoes total internal reflection.

Another method of this aspect for dynamically controlling the transmission and/or rejection of near-infrared and/or visible radiation through a window, comprises the steps of: providing a window of any of various embodiments of the present invention; and applying a voltage or voltages to the diffraction grating to control the spatial distribution of refractive indices of the electro-optic material. Preferably, in an embodiment, the window is controlled such that it rejects near-infrared radiation and transmits visible radiation.

Without wishing to be bound by any particular theory, there can be discussion herein of beliefs or understandings of underlying principles relating to the invention. It is recognized that regardless of the ultimate correctness of any mechanistic explanation or hypothesis, an embodiment of the invention can nonetheless be operative and useful.

DETAILED DESCRIPTION OF THE INVENTION

In an aspect, the present invention provides a dynamically controllable optoelectronic smart window which utilizes a diffraction grating for selective transmission or rejection of a specific region of the electromagnetic spectrum, for example the infrared, near-infrared and/or visible regions. The windows may further utilize a selectively controlled and/or patterned total internal reflection layer to assist with the selective rejection of a specific spectral region while allowing for transmission of another specific spectral region. In another aspect, the present invention provides methods for dynamically controlling the transmission or rejection of solar near-infrared and/or visible radiation.

Figure 1A:
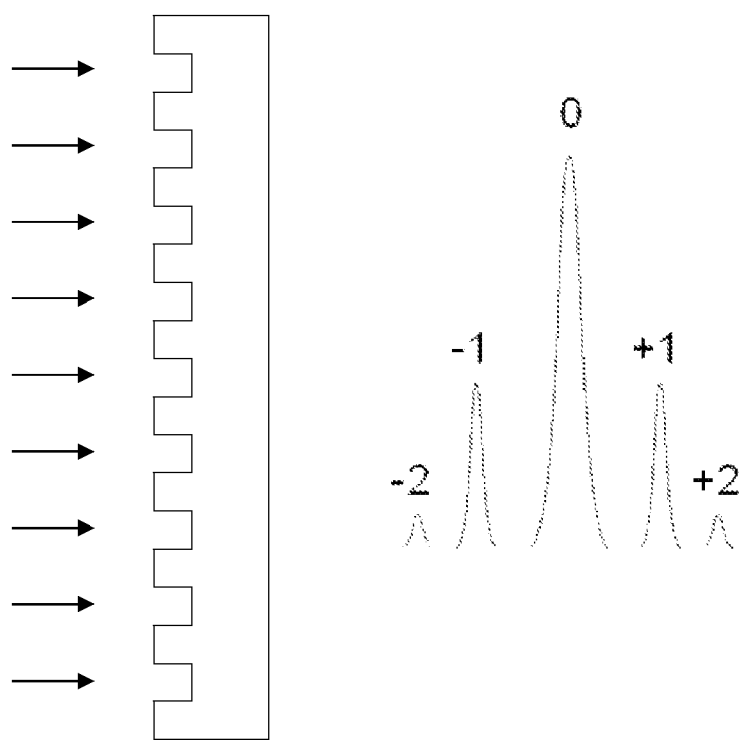
FIGS. 1a and 1b provide an example of the spectral output of a conventional diffraction grating and a blazed diffraction grating, respectively.
Figure 1B:
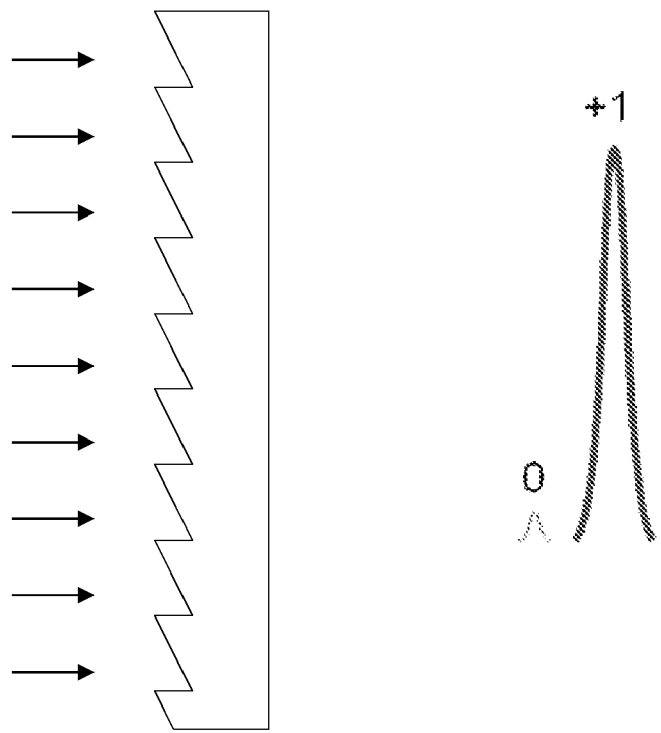

A blazed grating is a special type of diffraction grating that allows the diffracted radiation in a given spectral region to be highly concentrated into a desired, specific, non-zero diffraction order (generally +1 or −1). This is accomplished by forming grooves of a properly designed saw-tooth profile, as illustrated in FIG. 1b. The specific inclination of the groove face provides a constructive phase relationship between light rays exiting from different grooves, thus enabling the diffracted light of the given spectral band to be concentrated into a desired single diffraction order, shown as the +1 order in FIG. 1b. This allows a blazed grating to separate the IR radiation from the visible radiation extremely efficiently.

Such phase gratings can be produced by creating grooves of a surface-relief type or by inducing suitable refractive index changes by electronic or other means. The windows of various aspects of the invention utilize this unique property of blazed diffraction gratings established by an electro-optic material to optimally control the transmission of solar radiation, for example infrared and visible, through nominally transparent windows in buildings or other large enclosures.

Although such a grating is capable of separating spectral regions, the principal diffracted angle of one spectral region by a grating is expected to be restricted to a few degrees from the zero-order axis. An attempt to block the radiation of a specific spectral region from reaching the interior of the building may not be easily accomplished using a diffraction grating alone.

In an embodiment, liquid crystals are a useful electro-optic material. In a specific embodiment, a nematic liquid crystal is an exemplary electro-optic material. For example, a nematic liquid crystal is commonly used in flat panel displays as an intensity modulator. The nematic liquid crystal cell is placed between two polarizers. In the off state, incident light gets polarized and follows the twisted nematic liquid crystal pathway and transmits through the other polarizer resulting in zero absorption. However, when an electric field is applied, the liquid crystal starts to align along the field and reduces transmission.

Figure 2:
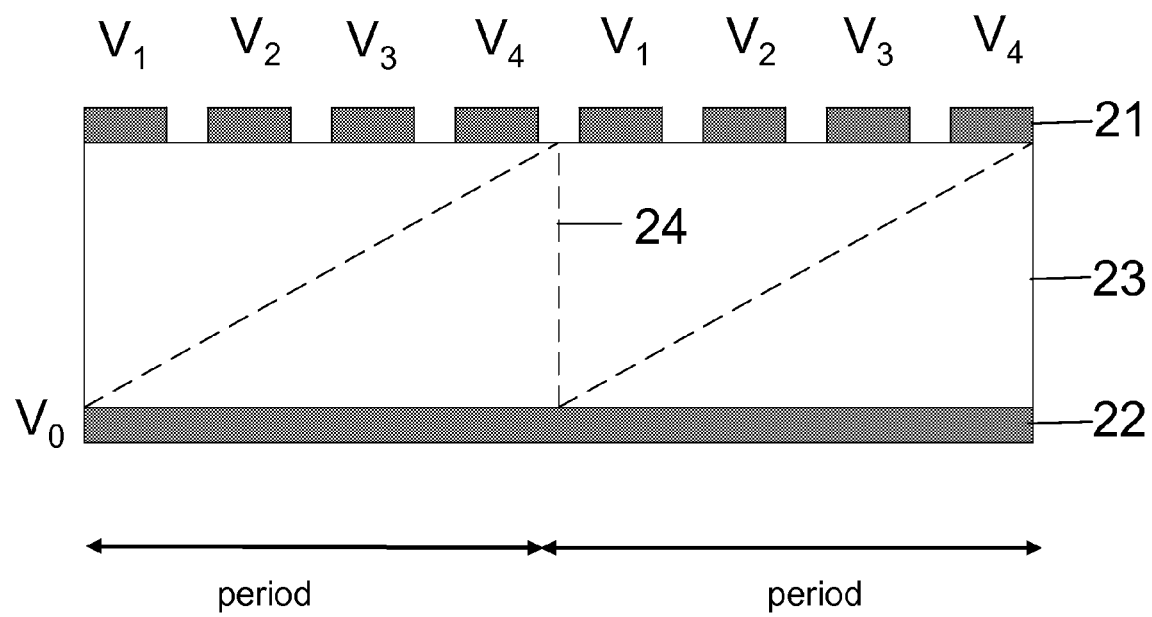
FIG. 2 provides a cross section of an embodiment of an electrically controllable diffraction grating.

In a specific embodiment, an electrically controllable nematic liquid crystal having a high optical anisotropy and transmission is used as a phase modulator, for example as utilized in applications such as non-mechanical beam steering and tunable focusing. As shown in an embodiment in FIG. 2, the liquid crystals 23 with high birefringence are placed between electrodes 21 and counter electrode 22. By applying a spatially periodic voltage (V1<V2<V3<V4) to electrodes 21 while counter electrode 22 is constant, liquid crystals 23 change the effective refractive index 24 accordingly resulting in a saw-tooth profile. This change can be regulated for a specific spectral band to adjust the phase retardation, and selective and efficient beam separation is achieved by blazed diffraction.

Figure 3:
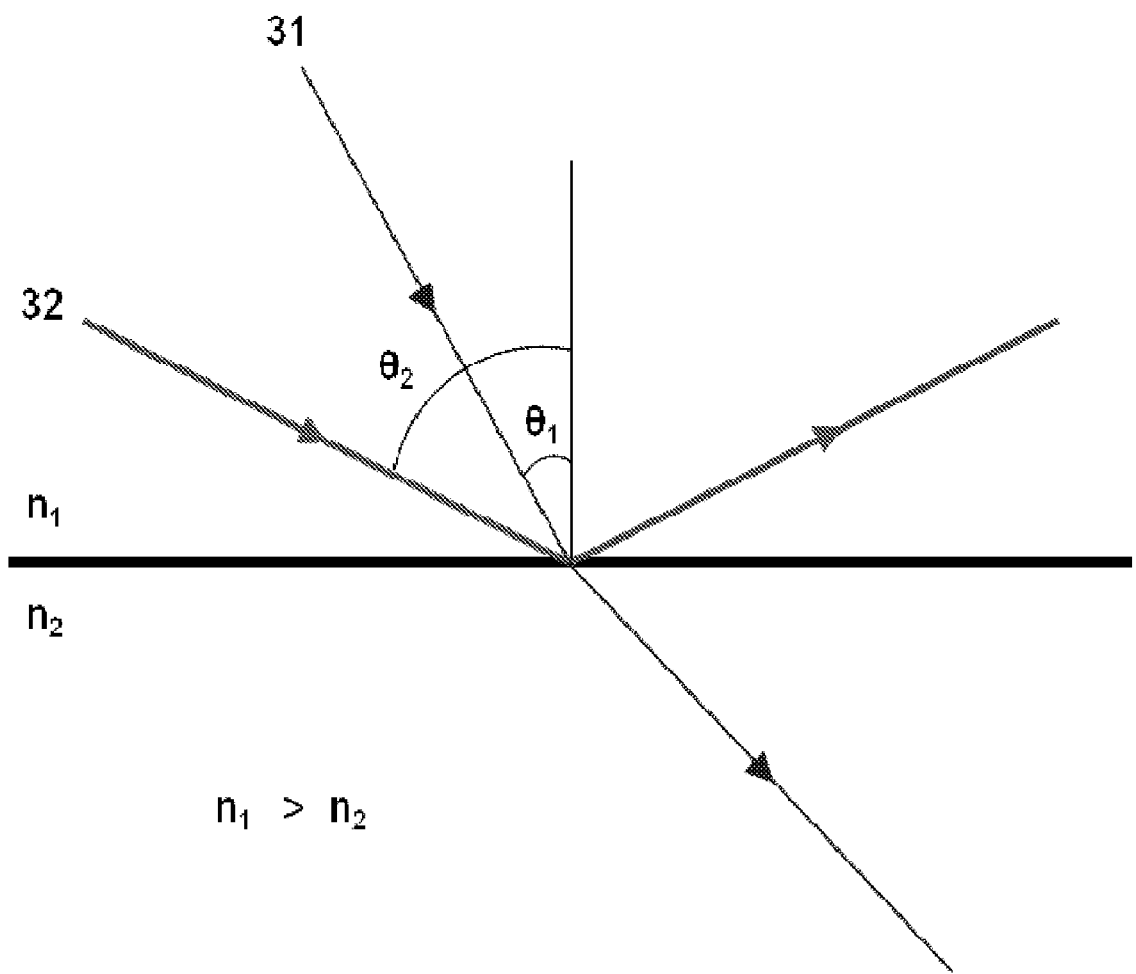
FIG. 3 provides an illustration of the phenomenon of total internal reflection.

In an embodiment, a window comprises a total internal reflection layer which selectively rejects diffracted light having an angle greater than the critical angle of the total internal reflection layer. The critical angle is determined by $\theta_c = \sin^{-1}(n_2/n_1)$, where $\theta_c$ is the critical angle, $n_1$ the refractive index of the first medium, and $n_2$ the refractive index of the second medium. When light crosses a boundary between materials with different refractive indices, as shown in FIG. 3, the light beam will be refracted and transmitted at the boundary surface if the angle of the incident ray 31 is lower than the critical angle. However, if the angle of incident ray 32 is greater than the critical angle (i.e. the ray is closer to being parallel to the boundary), then the light will stop crossing the boundary altogether and instead be reflected back internally. This can only occur when light travels from a medium with a higher refractive index $n_1$ to one with a lower refractive index $n_2$.

To exploit the sun's rays efficiently in the summer season, the amount of visible radiation that reaches the interior of a building should be maximized while the infrared radiation should be minimized. In an embodiment, a programmable grating diffracts the infrared rays with a distinct angle from the visible light. In an embodiment, the efficiency of a smart window is maximized when a functional layer between the grating layer and the glass substrate is inserted to reflect the infrared rays. For example, a bi-layer structure having a critical angle between the blazed diffracted angles of the visible and infrared rays results in glass that is transparent for visible rays, but opaque for infrared rays. In a specific embodiment, a smart window reflects the infrared radiation selectively within the spectrum of the blazed diffraction and comprises a combination of selected optical materials and a micro-cell array.

Figure 4:
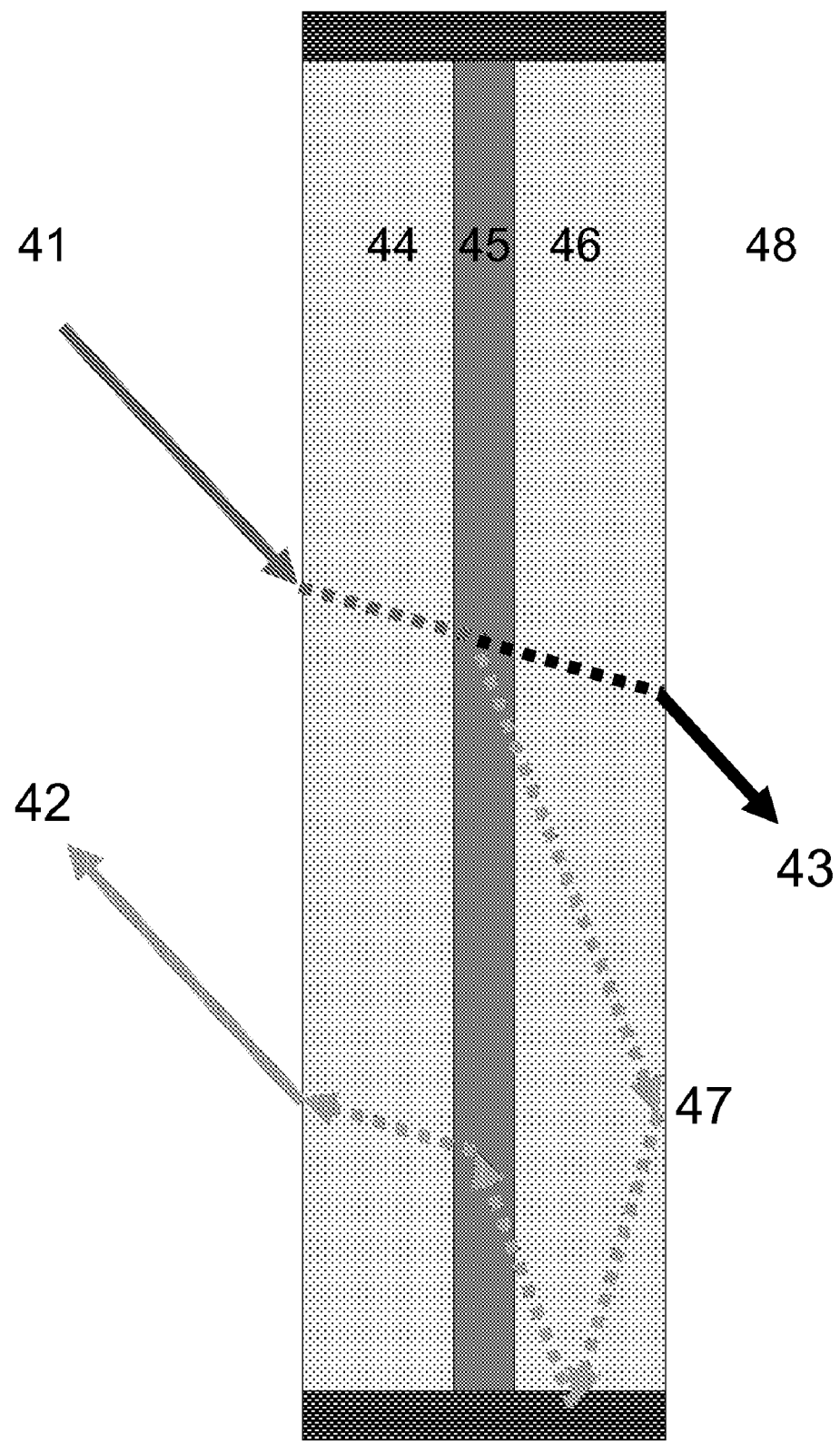
FIG. 4 illustrates a preferred embodiment of the cross section of a smart window.

An embodiment of a smart window system is illustrated in FIG. 4. The window system comprises an electrically controllable electro-optic blazed diffraction grating 45 sandwiched between two window panes. One pane 44 has a refractive index that is slightly lower than that of conventional glasses (~1.5). The other pane 46 has a refractive index that is higher than that of conventional glasses. The solar radiation 41 enters through the low index window pane 44. A low refractive index is preferred to minimize the refraction angle to retain the high incident angle. Harmful ultraviolet radiation to the electro-optic material is filtered by the low index window pane 44, while visible and infrared radiation reaches the electro-optic blazed diffraction grating 45 which separates infrared from visible radiation. The separated infrared radiation 42 travels through the high index substrate 46 and gets reflected back by total internal reflection 47 while visible radiation 43 transmits into the enclosure 48. A high index of refraction is preferred for pane 46 to ease total internal reflection by increasing the critical angle.

Figure 5A:
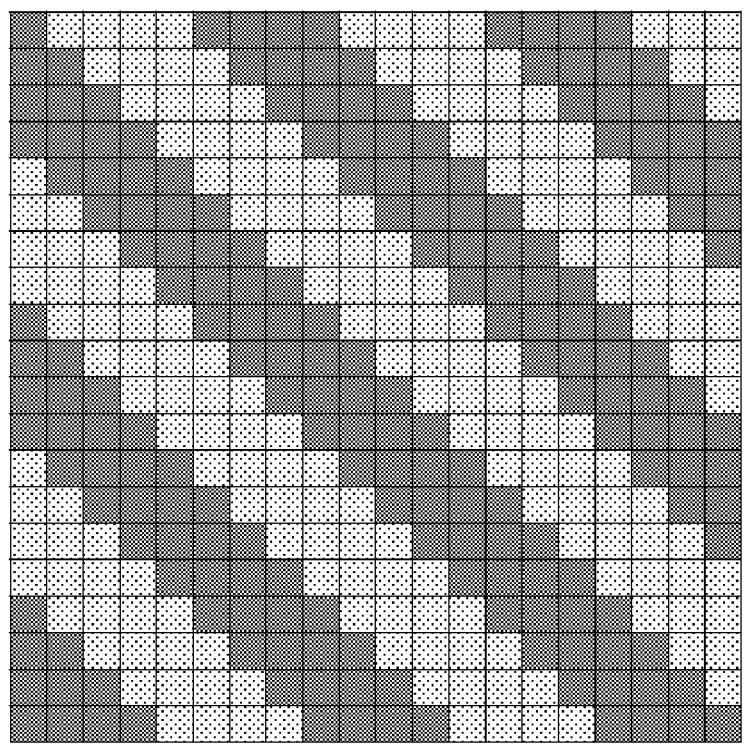
FIGS. 5a and 5b illustrate the spatial distribution and passive matrix control of a diffraction grating.
Figure 5B:
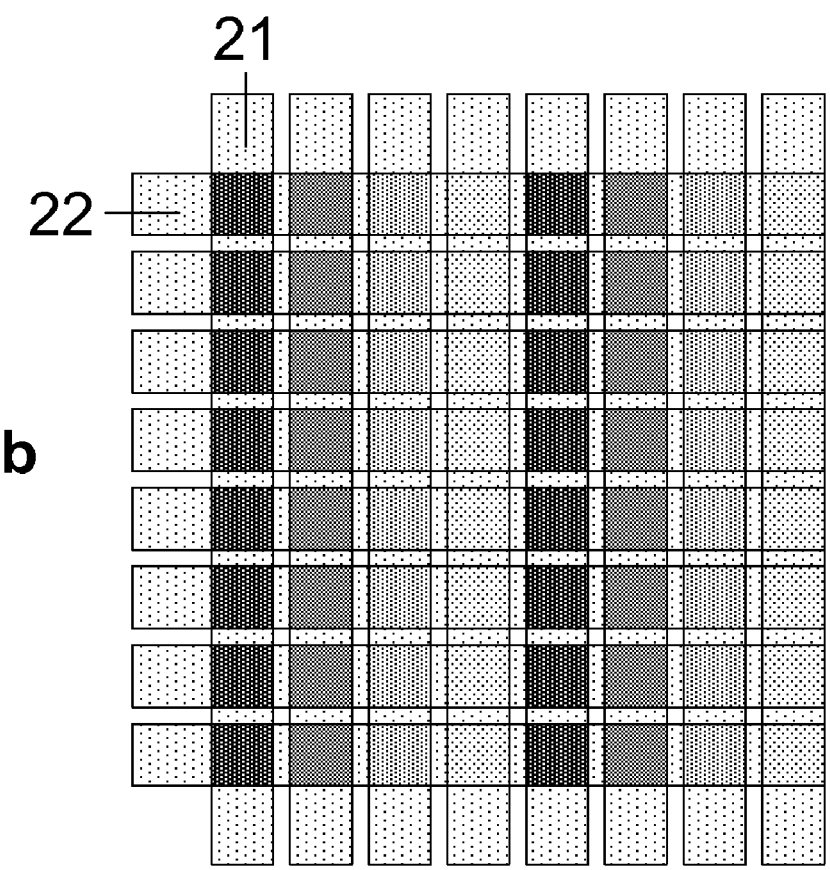

In a specific embodiment, the diffraction grating is created on a pixel-by-pixel basis as illustrated in FIG. 5a. Here, the pixelated grid structure is electronically programmed to create effective groove configurations in various desirable orientations that enable the window to function in the required mode. The control signals to the groups of pixels are provided through thin electrode films of a transparent conductive material such as indium tin oxide (ITO). A specific embodiment utilizes a passive-matrix method to drive the pixels by dividing the control signal into column 21 and row 22 as shown in FIG. 5b.

Figure 6:
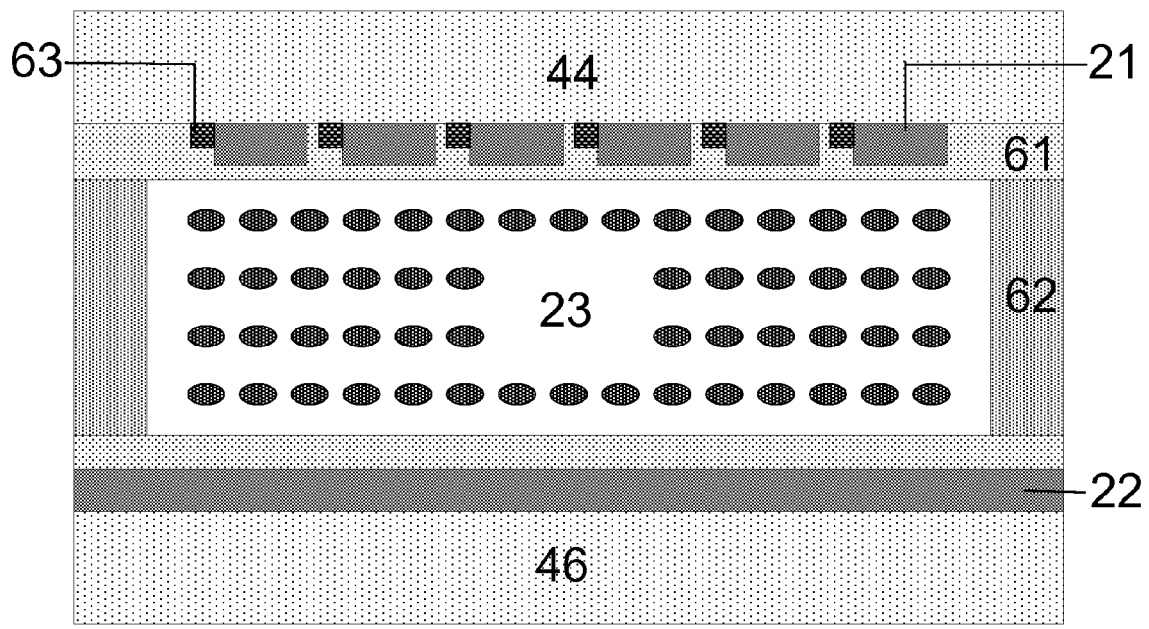
FIG. 6 illustrates the cross section of an exemplary diffraction grating.

The cross section of an exemplary optoelectronic window system is illustrated in FIG. 6. Optoelectronic material 23, for example a nematic liquid crystal, is sandwiched between the low index 44 and high index 46 window panes. A film of transparent conductive material 21, 22 such as indium tin oxide (ITO), is deposited on top of each window pane and patterned to form a pixelated grid. A transparent polymer layer 61 is coated to passivate the underlying transparent conductive electrodes. Next, the transparent polymer layer is cured, and rubbed to align the liquid crystal molecules along the rubbing direction. Metal bus lines 63 are connected to the patterned electrode 21, 22 to provide control signals from a programming module. Spacers 62 are either sprayed or patterned to sustain a uniform cell gap.

Figure 7A:
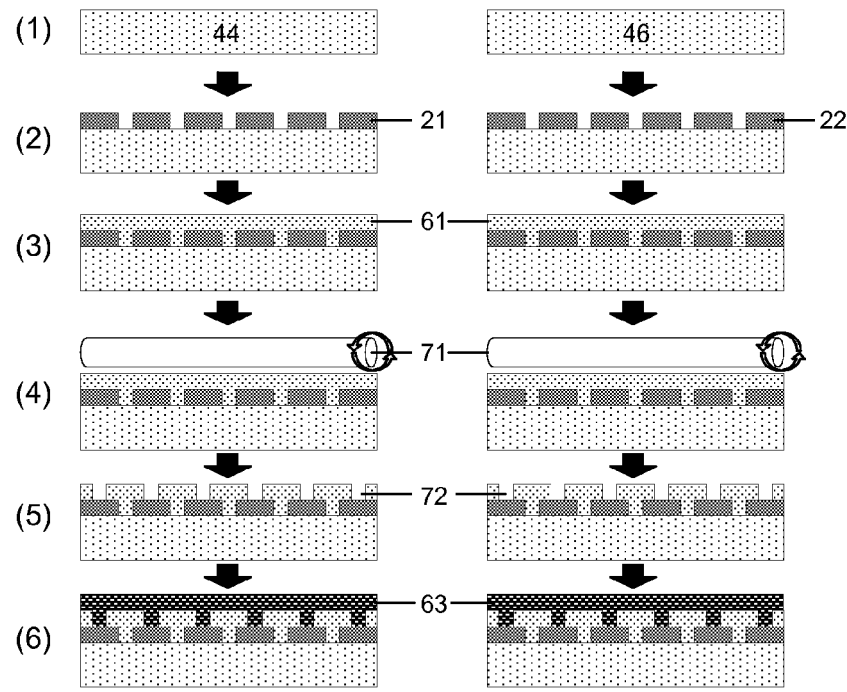
FIG. 7 illustrates steps for fabrication of an exemplary smart window.

A specific embodiment of a method for processing a low index 44 and high index 46 window panes is shown in the left and right panels of FIG. 7a, respectively. The method illustrated in FIG. 7a comprises the steps of: (1) the window panes are cleaned to remove any organics or harmful residues that will affect the adhesion of transparent conductive material; (2) a film of transparent conductive material is deposited and patterned to form the signal electrodes 21 and the scanning electrodes 22; (3) a thin polymer layer 61 is coated to passivate the electrodes and to align the liquid crystal; (4) the coated polymer layer 61 is cured and rubbed 71 to engrave submicron grooves into the layer for the liquid crystal alignment; (5) vias 72 are patterned to enable an electrical connection to the passivated electrodes; (6) high conductivity material 63 is deposited and patterned for the interconnects and data bus lines.

Figure 7B:
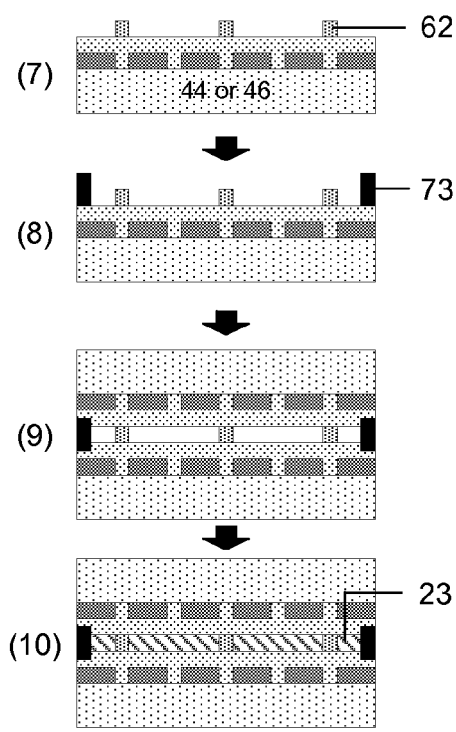

In a specific embodiment, the independently processed low index 44 and high index 46 window panes are assembling together by a method illustrated in FIG. 7b, comprising the steps: (7) spacers 62 with uniform heights are placed on either processed window pane; (8) Sealant 73 is applied on the edge of the active area (blazed diffraction grating) leaving an opening for injection of the electro-optic material; (9) the two window panes are pressed against each other to form a tight seal; and (10) the process is finalized by injecting electro-optic material (e.g., liquid crystal) 23 through the opening and sealing it.

An embodiment of a smart window that uses a blazed diffraction generated by a programmable liquid crystal grating is advantageous as it can account for the trajectory of the sun over the course of the day or the seasons. However, in some situations, infrared rays may only be diffracted at a limited angle instead of blocking the infrared rays completely. In an embodiment, a window of the present invention comprises a functional layer between the electro-optic material and the glass substrate. This functional layer satisfies conditions including, but not limited to one or more of the following: high transparency for visible range radiation; high transparency, but selective total internal reflection for infrared range radiation; and considerable resistance against heat, UV, and moisture. In a specific embodiment, a micro patterned functional layer is utilized in addition to optical materials selected to exploit its functionality.

In order to reflect incident radiation selectively the critical angle requirement for total internal reflection must be satisfied. Although the critical angle is primarily determined by the relationship described by $\theta_c = \sin^{-1}(n_2/n_1)$, the resultant reflective angle can be adjusted by changing the relationship of the normal vector between the substrate and interface. That is, by selecting the slope of the total internal reflection layer for diffracted rays, it is possible to selectively adjust critical angle for infrared TIR to be between the blazed diffraction angles for the visible and infrared radiation.

More than two polymer layers are needed to make such a TIR layer. In an embodiment, a low refractive index layer is patterned as a volumetric cell, and in a preferred embodiment, has a thickness ranging from 1 μm to 100 μm. In an embodiment, large area technologies, such as those that are well-established in display industry, are utilized to apply the TIR layer to a window.

Figure 8:
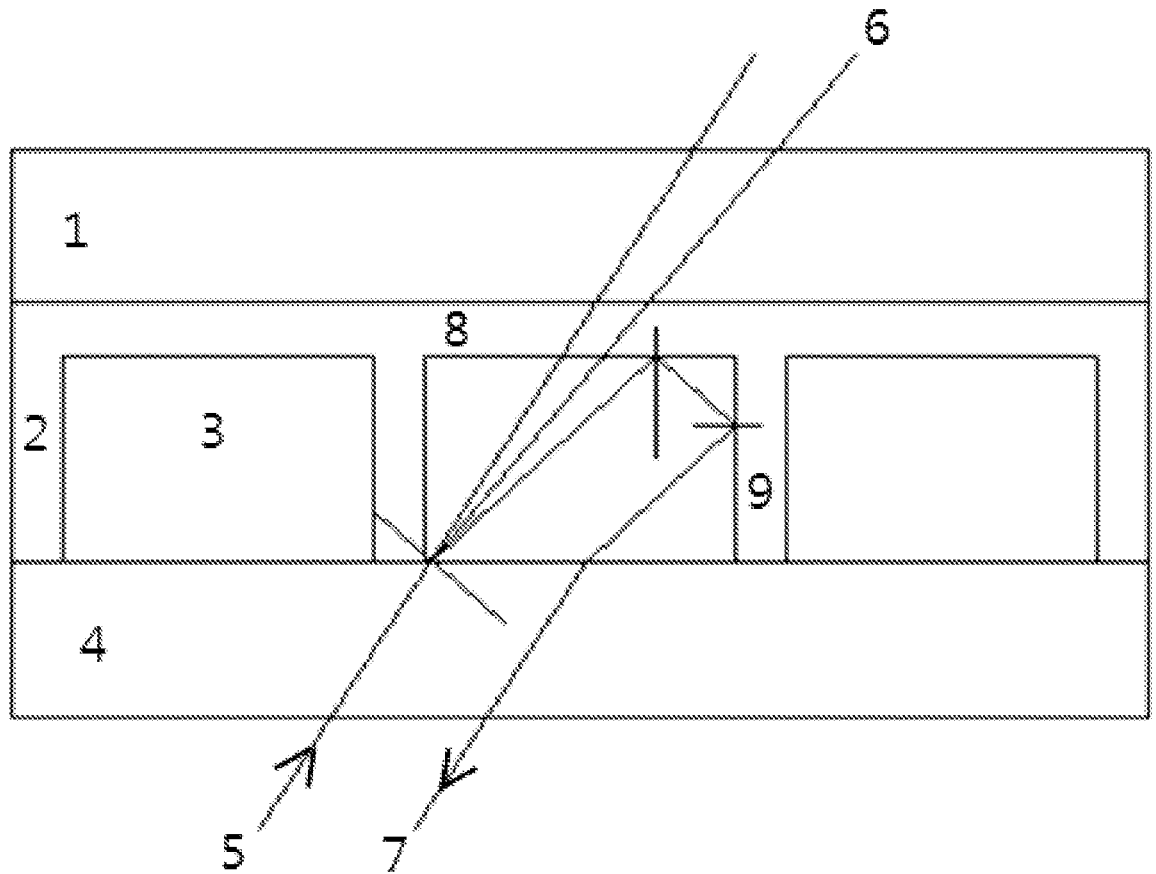
FIG. 8 illustrates an embodiment of the cross section of a window comprising an array of microcells.

FIG. 8 illustrates an embodiment of a window comprising such a functional layer. Here, the path of oblique solar radiation 5 is shown. After transmission through the programmable blazed grating 4, the solar radiation is divided into visible diffraction peak 6 and the infrared diffraction peak 7. The first order of the blazed diffraction peak of visible rays has an angle between path 5 and 6, and infrared ray has an angle between path 5 and 7. The difference between these angles against surface 8 causes the visible ray to go through the surface 8, whereas infrared ray cannot be transmitted through surface 8 as total internal reflection occurs. Here the incident beam has a larger angle than the critical angle determined by relationship of refractive index of two adjacent materials shown as material 2 and 3. Total-internal-reflected infrared rays travel following trajectory 7. It can reflect once again at surface 9 if the condition for TIR is satisfied. Therefore, unwanted infrared radiation can be blocked successfully. In an embodiment, in order to maximize the efficiency of infrared radiation blocking, the slopes of surfaces 8 and/or 9 can be varied depending on how the programmable blazed grating changes the angle between the visible and infrared rays under given conditions. The refractive index of two materials, 2 and 3, can further be selected to maximize the efficiency (i.e., selectively control the critical angle).

Figure 9A:
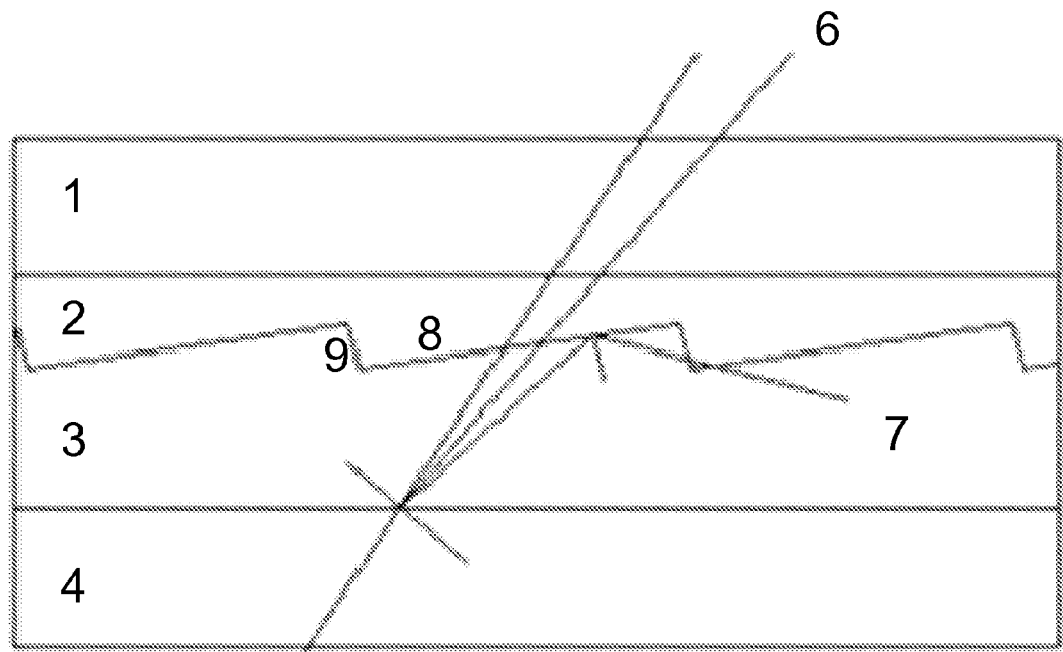
FIGS. 9a and 9b illustrate two other embodiments of the cross section of a window comprising an array of microcells.
Figure 9B:
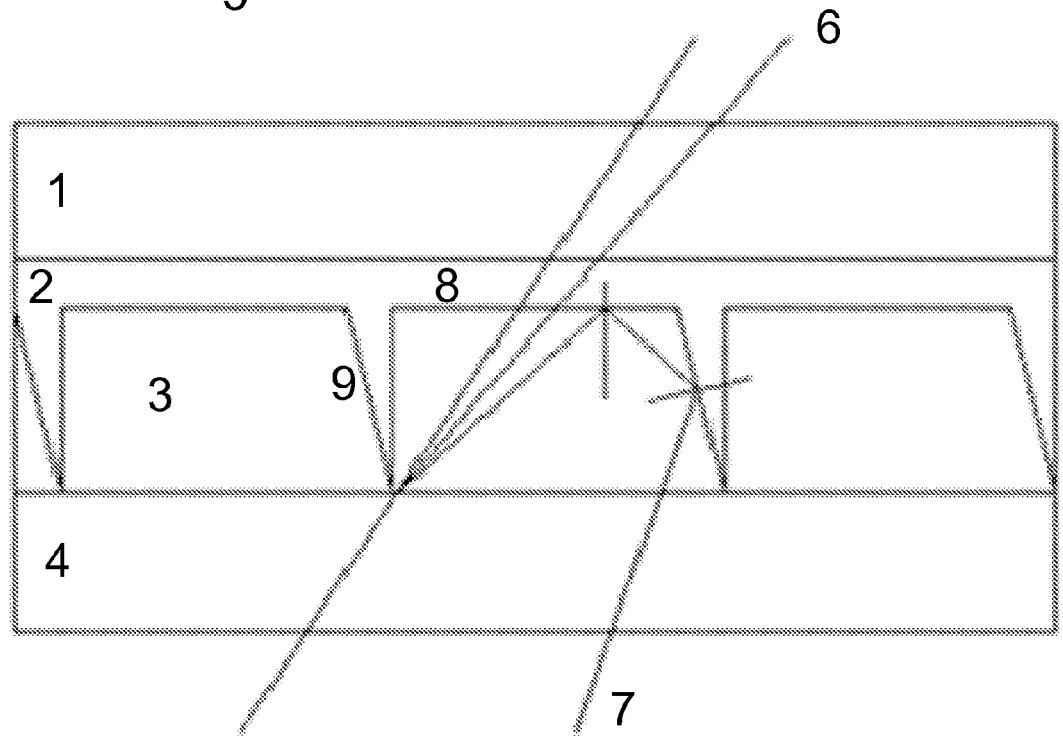

In another aspect, control of the plane angle on which the TIR phenomenon happens by optimizing the geometry of the micro cell allows for additional control over the efficiency of the window. FIGS. 9a and 9b shows two embodiments of such a cell. The embodiment shown in FIG. 9a is allows for TIR when the diffracted angle is not sufficiently large. In the embodiment shown in FIG. 9b, vertical cell wall 9 allows for TIR to reflect the infrared radiation to the sky, not other buildings or pedestrians on street.

Figure 10:
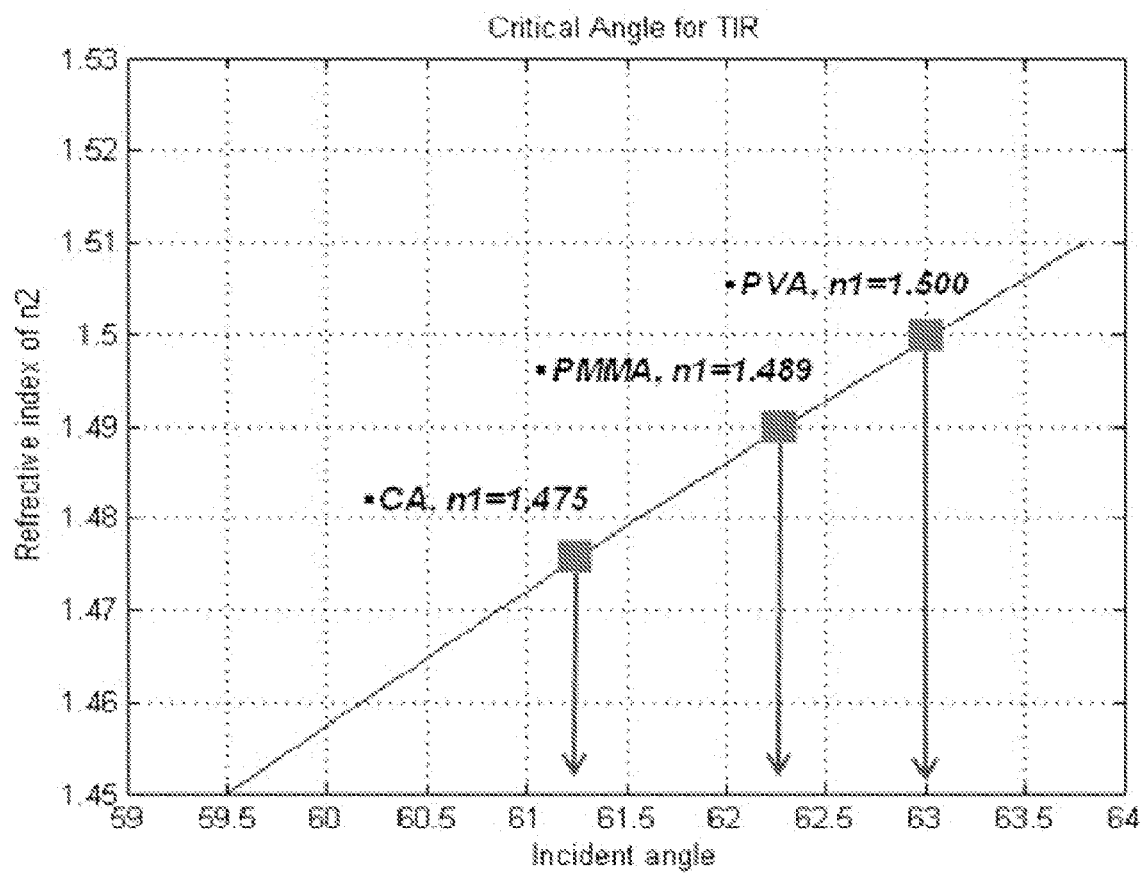
FIG. 10 shows a plot of the critical angle for total internal reflection when the high index material is PVK.

Useful optical polymeric materials are shown in Table 1. PVK with a refractive index of 1.683 is an exemplary polymer for use as the high refractive index layer. In an embodiment, PVK is the top layer; thus, optical polymeric materials with a low refractive index below 1.5 may be optimally used as the bottom cell layer. For example when PVA, having refractive index of 1.50, is utilized with PVK the critical angle for TIR with PVK is 63 degrees. FIG. 10 illustrates the resultant critical angle when PVK is selected as the high refractive index layer. FIG. 10 shows selection of the materials PMMA and CA as the low refractive index layer would result in critical angles of 62.25 and 61.25 degrees, respectively. For example, all polymeric materials listed in Table 1 can be utilized as the high refractive index material except for PTFE; likewise, all polymeric materials listed in Table 1 can be utilized as the low refractive index material except for PVK. All materials in Table 1 may further be utilized as any layer or window pane for the windows of various aspects of the present invention.

TABLE 1

Exemplary polymer materials

| Abbreviation | Polymer | Refractive index |
|---|---|---|
| PVK | Poly(N-vinyl carbazole) | 1.68 |
| PPX | Poly(p-xylylene) | 1.67 |
| PEEK | Polyether ether ketone | 1.65 |
| PSU | Polysulfone resin | 1.63 |
| PS | Polystyrene | 1.59 |
| PC | Polycarbonate resin | 1.59 |
| PET | Poly(ethylene terephthalate) | 1.58 |
| SAN | Styrene/acrylonitrile copolymer | 1.57 |
| PVC | Poly(vinyl chloride) | 1.54 |
| PVP | Poly(N-vinyl pyrrolidone) | 1.53 |
| PE | Polyethylene | 1.51 |
| EMA | Ethylene/methacrylic acid ionomer, sodium ion | 1.51 |
| PVA | Poly(vinyl alcohol) | 1.50 |
| MC | Methyl cellulose | 1.50 |
| PMMA | Poly(methyl methacrylate) | 1.49 |
| CA | Cellulose Acetate | 1.47 |
| PEA | Poly(ethyl acrylate) | 1.47 |
| PVDF | Poly(vinylidene fluoride) | 1.42 |
| PDMS | Poly(dimethyl siloxane) | 1.40 |
| PTFE | Poly(tetrafluoroethylene) | 1.35 |

The invention may be further understood by the following non-limiting examples.

EXAMPLE 1

Fabrication Methods

Listed below are several methods which are utilized for fabrication of a film with a wide range of thicknesses and narrow uniformities to tolerance limits which are useful with the windows and methods described herein. For example, useful methods for forming a TIR layer include, but are not limited to:

Spin coating: Spin coating is a method of obtaining a uniform film thickness by disposing the coating solution with a viscosity on the substrate spinning at a specific rate usually ranging from 1000 rpm to 5000 rpm. It has been used to obtain relatively thin films.

Roll coating: This method uses 2 or 3 rolls, which rotate at a fast rate. First, a material feeding system coats the slurry material onto the first rotating roller; next, the slurry on the first roll is transferred to the second rotating roll. During this procedure, the desired uniformity and film thickness may be achieved. Finally, material on the second rotating roll is coated onto a flexible film or a rigid glass.

Doctor blade coating: The substrate is dispensed with a polymeric solution or resin that moves beneath the applicator with a narrow gap corresponding to the film thickness. The coating solution has a viscosity of at least 1,000 cps and is suitable for fabricating thick films over 20 µm in thickness. Both glass and polymer can be used as a substrate for this method.

Table coating: This method has been widely used as a large area coating process to get thick films ranging from 5 µm to 200 µm. It uses a precise nozzle having a narrow slit that coats the substrate as the solution is squeezed out of the nozzle. This is the main coating process used in the plasma display industry.

Film laminating: This method exploits carrier films coated with a polymeric solution or photoresist. Both heat and pressure are applied via laminating rubber rollers to attach material on the carrier film to the surface of the substrate. It is the simplest process to get uniform and large area films without using complex equipment, but the cost of the laminating film is usually higher than that of materials for other coating processes.

Screen printing: This is a traditional and easy-to-use method where the desired coating material with a viscosity of typically more than 10,000 cps is squeezed out through a screen mesh onto the substrate. The typical range of film thickness obtained from this method is 1 µm to 10 µm. This method is typically cheaper than other methods, but does not produce a good film quality due to mesh stain after coating.

In an aspect, micropatterning may be utilized for fabrication of a smart window. For example, micropatterning is useful for forming a microscopically designed shape or structure on a target layer. Several useful micro patterning methods include, but are not limited to:

Photolithography/etching method: Light of a certain wavelength reacts with the photo-initiator in the photoresist (PR). First, the PR coated target layer is illuminated through the patterned photo mask; afterwards, the undesired part of PR is removed by the developing process. After the photolithography process, an etchant is applied to the target layer with the patterned PR to obtain a microscopically patterned layer.

Photoablation method: This method produces a pattern directly on the substrate with a laser. The mechanism of the ablation depends on the target material, and is usually related to sublimation by thermal energy and decomposition by excitement of chemical species. The most attractive point of the photoablation method as compared to photolithography/etching method is that it does not require the etch process.

Nano/micro imprinting method: In the standard imprinting process, a thin layer of imprint resist is spin coated onto the sample substrate. Then, the mold having predefined topological patterns is brought into contact with the sample and they are pressed together under a certain pressure. When heated up above the glass transition temperature of the polymer, the pattern on the mold is pressed into the polymeric film. After the sample is cooled down, the mold is separated from the sample and the resist pattern is left on the substrate. A pattern transfer process can then be used to transfer the pattern in the resist to the substrate underneath.

EXAMPLE 2

Total Internal Reflection Layer Material Selection

The primary condition for total internal reflection is the selection of at least two materials with different refractive indices. In addition, the TIR material should have the following properties:

All materials used in the TIR layer should have a high optical transmittance in the visible spectrum (0.3~0.7 µm) and the infrared spectrum (0.7~3.0 µm).

All materials should be easy to coat and should not damage the underlying layers during processing. If the solvent used in the top layer to prepare the coating solution is similar to the one in the bottom layer, severe damage can be expected in the bottom layer during coating and drying.

Sharply defined 3-dimensional cells can be patterned with well known patterning processes. The widely accepted patterning methods include photolithography and etching, laser ablation, pattern printing, and micro-molding.

The materials should have a reliable resistance against heat, ultraviolet radiation, and moisture during application.

The materials that satisfy the conditions described above include optical polymers, optical ceramics, and composites (which are composed of optical polymer and ceramics). In particular, optical polymers are the useful because of their low cost and ease of fabrication. Moreover, the optical polymers can be used as a matrix phase of composites containing optical and functional ceramics to compensate for their properties. Although the range of selection of polymeric materials is very wide, thermoplastics are an especially useful class of polymers for the TIR application.

Most well-known optical polymers belong to the family of vinyl polymers that are also widely used in other fields: poly (vinyl alcohol) (PVA), poly(vinyl chloride) (PVC), poly(vinyl carbozole) (PVK), poly(vinyl pirrolidone) (PVP), polystyrene (PS), and poly(methyl methacrylate) (PMMA) are common examples of these optical polymers. PVA is an environmentally-friendly polymer because it uses an aqueous liquid as a solvent; it has also been used as a bio material. PVC has been used in structural parts such as pipes, and PVK has been used as a matrix phase encapsulating dye in conductive layers of organic LEDs. PS has the potential to be used as a material for high efficiency solar cells. PMMA has excellent optical, mechanical, and thermal properties and is the most similar to commercial glass among plastic materials known so far. All polymeric materials mentioned above have been studied by many researchers as optical waveguides which have similar characteristics as the TIR layer.

EXAMPLE 3

In an energy-efficient optoelectronic window system embodiment, several technical elements are utilized in novel ways. As already mentioned, one component of a window system is a transmissive blazed diffraction grating and a total internal reflection layer, which are attached, fabricated and configured in such a manner that their spectral characteristics can be selected in desirable ways to dynamically change their reflectivity and transmission for near-IR as well as visible light. The window structure, as illustrated in FIGS. 11$a$ and 11$b$, comprises an outer glass pane, a programmable blazed diffraction grating layer, an inner glass pane, and a total internal reflection (TIR) pane. The programmable blazed diffraction grating layer is pixelated and its refractive index is pixel-wise modulatable by an array of electrodes, enabling a phase grating that can be programmed to function as a blazed grating only for the near-IR spectral component of the solar radiation. The programmable blazed diffraction grating layer is protected from solar UV radiation by a UV blocking layer. The window can be dynamically configured either as a heat rejection mode window or a heat acceptance mode window.

Figures 11A, 11B:
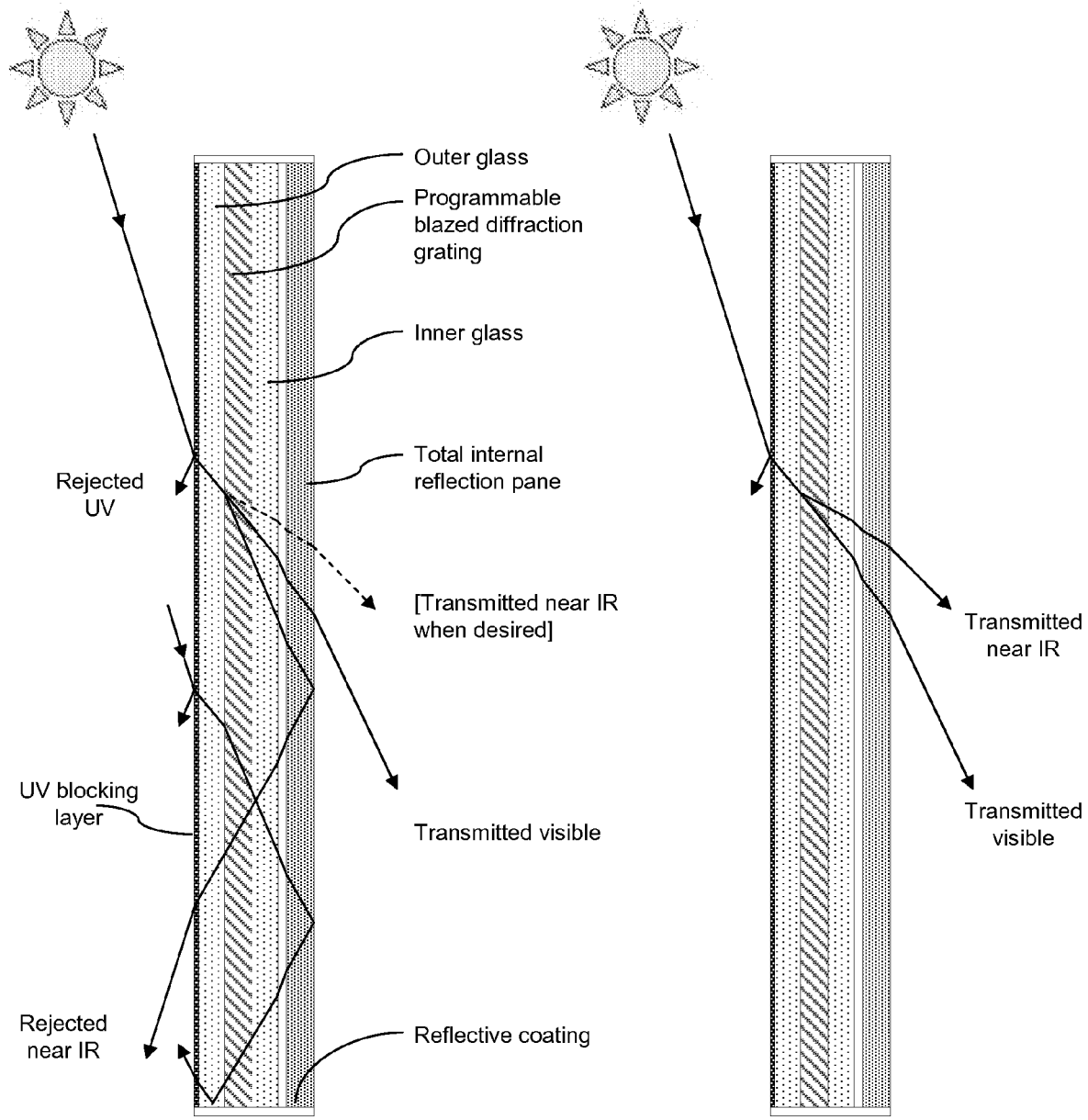
FIG. 11a illustrates a dynamic, energy-efficient, optoelectronic smart window based on a programmable blazed diffraction grating where near-IR light is rejected, and visible light is transmitted.
FIG. 11b illustrates a dynamic, energy-efficient, optoelectronic smart window based on a programmable blazed diffraction grating where both near-IR light and visible light are transmitted.

An example for the heat rejection mode is shown in FIG. 11a. One optical characteristic of blazed gratings is their high efficiency in directing most of the diffracted radiation in a single non-zero order (+1st order in FIG. 11a). This enables direction of the near-IR radiation at the final optical surface at an angle greater than the critical angle for TIR, which redirects it to the exterior. Note that the visible component, being the 0th order, passes through to the interior. In FIG. 11b, the grating is programmed to direct the diffracted near-IR radiation into the −1st order, which strikes the exit surface at an angle less than the critical angle so that it does not undergo TIR, and therefore enters the interior. The visible component, again being the 0th order, enters the interior. Further, as illustrated in FIG. 5a, the pixelated structure of the programmable blazed diffraction grating layer enables orientation of the 'grooves' (i.e., refractive index modulations) of the blazed grating in any direction, providing the ability to track the elevation and azimuth of the sun, thus enabling the smart window to deliver its peak energy efficiency for different times of the day, seasons, and locations.

Statements Regarding Incorporation by Reference and Variations

All references throughout this application, for example patent documents including issued or granted patents or equivalents; patent application publications; and non-patent literature documents or other source material; are hereby incorporated by reference herein in their entireties, as though individually incorporated by reference, to the extent each reference is at least partially not inconsistent with the disclosure in this application (for example, a reference that is partially inconsistent is incorporated by reference except for the partially inconsistent portion of the reference).

All patents and publications mentioned in the specification are indicative of the levels of skill of those skilled in the art to which the invention pertains. References cited herein are incorporated by reference herein in their entirety to indicate the state of the art, in some cases as of their filing date, and it is intended that this information can be employed herein, if needed, to exclude (for example, to disclaim) specific embodiments that are in the prior art. For example, when a compound is claimed, it should be understood that compounds known in the prior art, including certain compounds disclosed in the references disclosed herein (particularly in referenced patent documents), are not intended to be included in the claim.

When a group of substituents is disclosed herein, it is understood that all individual members of those groups and all subgroups, including any isomers and enantiomers of the group members, and classes of compounds that can be formed using the substituents are disclosed separately. When a Markush group or other grouping is used herein, all individual members of the group and all combinations and subcombinations possible of the group are intended to be individually included in the disclosure.

Every formulation or combination of components described or exemplified can be used to practice the invention, unless otherwise stated. One of ordinary skill in the art will appreciate that methods, device elements, starting materials, and synthetic methods other than those specifically exemplified can be employed in the practice of the invention without resort to undue experimentation. All art-known functional equivalents, of any such methods, device elements, starting materials, and synthetic methods are intended to be included in this invention. Whenever a range is given in the specification, for example, a distance or length range, a time range, or a composition range, all intermediate ranges and subranges, as well as all individual values included in the ranges given are intended to be included in the disclosure.

As used herein, "comprising" is synonymous with "including," "containing," or "characterized by," and is inclusive or open-ended and does not exclude additional, unrecited elements or method steps. As used herein, "consisting of" excludes any element, step, or ingredient not specified in the claim element. As used herein, "consisting essentially of" does not exclude materials or steps that do not materially affect the basic and novel characteristics of the claim. Any recitation herein of the term "comprising", particularly in a description of components of a composition or in a description of elements of a device, is understood to encompass those compositions and methods consisting essentially of and consisting of the recited components or elements. The invention illustratively described herein suitably may be practiced in the absence of any element or elements, limitation or limitations which is not specifically disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the concepts herein disclosed may be resorted to by those skilled in the art, and that such modifications and variations are considered to be within the scope of this invention as defined by the appended claims.

We claim:

1. A window comprising:
  a first window pane having a first index of refraction;
  a second window pane having a second index of refraction, wherein the first index of refraction is smaller than the second index of refraction; and
  a diffraction grating comprising:
    an electro-optic material positioned between the first and second window panes;
    a counter electrode; and
    a two-dimensional array of signal electrode elements;
    wherein the electro-optic material is provided between the counter electrode and the two-dimensional array of signal electrode elements such that voltages applied between the counter electrode and the signal electrode elements provide a selected spatial distribution of refractive indices to the electro-optic material.

2. The window of claim 1, wherein the electro-optic material comprises liquid crystals.

3. The window of claim 2 wherein the liquid crystals are nematic liquid crystals.

4. The window of claim 2, wherein the orientation of the liquid crystals is electrically controllable.

5. The window of claim 2, wherein the liquid crystals have a birefringence selected from the range of 0.15 to 0.33.

6. The window of claim 1, wherein the electro-optic material comprises an optical ceramic.

7. The window of claim 1, wherein the diffraction grating is a blazed grating.

8. The window of claim 7, wherein the blazed grating is optimized for simultaneous acceptance of or rejection of the near-infrared spectral region, and for transmission of the visible spectral region through the first and second window panes.

9. The window of claim 1, wherein voltages applied between the counter electrode and each element of the array of signal electrode elements provides a spatially periodic index of refraction within the electro-optic material.

10. The window of claim 1, wherein each signal electrode element is independently electrically addressable.

11. The window of claim 1, wherein the counter electrode has a first voltage and each element of the array of signal electrode elements has a voltage independent of the first voltage.

12. The window of claim 1, wherein voltage differences between the counter electrode and each element of the array of signal electrode elements provides the selected spatial distribution of refractive indices.

13. The window of claim 1, wherein the electro-optic material region has a spatially periodic index of refraction.

14. The window of claim 13 wherein the spatial period is selected from the range of 1 to 100 μm.

15. The window of claim 1, wherein the spatial distribution of refractive indices has a sawtooth profile.

16. The window of claim 1, wherein the electro-optic material region has a thickness selected from the range of 1 to 10 μm.

17. The window of claim 1, wherein the diffraction grating is transparent or has a transmittance above 50%.

18. The window of claim 1, wherein the diffraction grating is transparent to light having a wavelength between 0.3 and 3.0 μm.

19. The window of claim 1, wherein the counter electrode or the array of signal electrode elements comprises a UV blocking layer.

20. The window of claim 1, wherein the counter electrode comprises a transparent conductor.

21. The window of claim 20, wherein the counter electrode comprises a transparent conducting oxide.

22. The window of claim 21, wherein the counter electrode comprises Indium Tin Oxide.

23. The window of claim 21, wherein the counter electrode comprises Indium Zinc Oxide.

24. The window of claim 1, wherein the counter electrode has a thickness selected from the range of 50 to 200 nm.

25. The window of claim 1, wherein the array of signal electrode elements comprises an array of transparent conductors.

26. The window of claim 25, wherein the array of signal electrode elements comprises a transparent conducting oxide.

27. The window of claim 26, wherein the array of signal electrode elements comprises Indium Tin Oxide.

28. The window of claim 26, wherein the array of signal electrode elements comprises Indium Zinc Oxide.

29. The window of claim 1, wherein the array of electrode elements has a thickness selected from 50 to 200 nm.

30. The window of claim 1, wherein each signal electrode element within the array of signal electrode elements has a width selected from the range of 1 to 10 μm.

31. The window of claim 1, wherein each signal electrode element within the array of signal electrode elements has a length selected from the range of 1 to 10 μm.

32. The window of claim 1, wherein the array of signal electrode elements has an inter element spacing selected from the range of 0.1 to 2 μm.

33. The window of claim 1, wherein a voltage applied between the counter electrode and the signal electrode elements changes the orientation of the electro-optic material.

34. The window of claim 1, wherein a voltage applied between the counter electrode and the signal electrode elements changes the index of refraction of the electro-optic material.

35. The window of claim 1, wherein the first window pane and the diffraction grating are in optical communication.

36. The window of claim 1, wherein the diffraction grating and the second window pane are in optical communication.

37. The window of claim 1, wherein the first index of refraction is selected from the range of 1.3 to 1.6.

38. The window of claim 1, wherein the second index of refraction is selected from the range of 1.4 to 1.7.

39. The window of claim 1, wherein light which passes through the first or second window pane is diffracted by the diffraction grating to generate diffracted light.

40. The window of claim 39, wherein at least a portion of the diffracted light undergoes total internal reflection in the second window pane.

41. The window of claim 1, further comprising a total internal reflection layer positioned such that the second window pane is positioned between the diffraction grating and the total internal reflection layer.

42. The window of claim 41, wherein at least a portion of light incident on the total internal reflection layer undergoes total internal reflection.

43. The window of claim 1, wherein the first and second window panes each independently comprise a material selected from the group consisting of PVA, PVK, PDMS, and PMMA.

44. The window of claim 1, wherein the first and second window panes each independently have thicknesses selected from the range of 10 to 50 mm.

45. The window of claim 1, further comprising a microcell array positioned in optical communication with the diffraction grating.

46. The window of claim 45, wherein the microcell array is incorporated into the second window pane.

47. The window of claim 45, wherein at least a portion of light incident on the microcell array undergoes total internal reflection.

48. The window of claim 45, wherein the microcell array comprises a first material and second material.

49. The window of claim 48, wherein the first and second materials are each independently selected from the group consisting of PVA, PVK, PDMS, and PMMA.

50. The window of claim 48, wherein the first material and the second material have different indices of refraction.

51. The window of claim 45, wherein the microcell array comprises a plurality of microcell elements and an intercell region.

52. The window of claim 51, wherein the microcell elements comprise a first material and the intercell region comprises a second material.

53. The window of claim 52, wherein the microcell elements have thicknesses selected from the range of 1 to 100 μm.

54. The window of claim 51, wherein the microcell elements have widths selected from the range of 1 to 1000 μm.

55. The window of claim 51, wherein the microcell elements have lengths selected from the range of 1 to 1000 μm.

56. The window of claim 51, wherein the spacing between microcell elements is selected from the range of 1 to 1000 μm.

57. The window of claim 51, wherein the microcell elements are each surrounded on at least one side by the intercell region.

58. The window of claim 57, wherein the microcell elements are each surrounded on at least three sides by the intercell region.

59. The window of claim 58, wherein the microcell elements are each surrounded on at least five sides by the intercell region.

60. The window of claim 59, wherein the intercell region has a thickness selected from the range of 0 to 20 μm.

61. The window of claim 1, further comprising a UV blocking layer positioned in optical communication with the first window pane, the second window pane, or the diffraction grating.

62. The window of claim 1, wherein the selected spatial distribution of refractive indices is electrically controllable.

63. A method of dynamically controlling the transmission and/or rejection of solar near-infrared and/or visible radiation through a window, the method comprising the steps:
providing a window comprising:
a first window pane having a first index of refraction;
a second window pane having a second index of refraction; and
a diffraction grating between the first and second window panes, wherein the diffraction grating comprises:
an electro-optic material positioned between the first and second window panes;
a counter electrode; and
a two-dimensional array of signal electrode elements;
wherein the electro-optic material is provided between the counter electrode and the two-dimensional array of signal electrode elements such that voltages applied between the counter electrode and the signal electrode elements provide selected spatial distribution of refractive indices to the electro-optic material;
a total internal reflection layer positioned such that the second window pane is positioned between the diffraction grating and the total internal reflection layer; and
dynamically controlling the spatial distribution of refractive indices of the electro-optic material, such that solar near-infrared and visible radiation incident on the window is transmitted or rejected as desired.

64. The method of claim 63, wherein the first and second window panes each independently comprise material selected from the group consisting of PVA, PVK, PDMS, and PMMA.

65. The method of claim 63, wherein the first index of refraction is different from the second index of refraction.

66. The method of claim 63, wherein at least a portion the solar near-infrared radiation incident on the total internal reflection layer undergoes total internal reflection.

67. The method of claim 66, wherein a majority of the solar near-infrared radiation incident on the total internal reflection layer undergoes total internal reflection.

68. A method of dynamically controlling the transmission and/or rejection of near-infrared and/or visible radiation through a window, the method comprising the steps:
providing a window of claim 62; and
applying a voltage or voltages to the diffraction grating to control the spatial distribution of refractive indices of the electro-optic material.

69. The method of claim 63, wherein the window rejects near-infrared radiation and transmits visible radiation.

70. The method of claim 68, wherein the window rejects near-infrared radiation and transmits visible radiation.

71. A window comprising:
a first window pane having a first index of refraction;
a second window pane having a second index of refraction;
a diffraction grating comprising:
an electro-optic material positioned between the first and second window panes;
a counter electrode; and
a two-dimensional array of signal electrode elements;
wherein the electro-optic material is provided between the counter electrode and the two-dimensional array of signal electrode elements such that voltages applied between the counter electrode and the signal electrode elements provide a selected spatial distribution of refractive indices to the electro-optic material; and
a microcell array positioned in optical communication with the diffraction grating.

72. The window of claim 71, wherein the microcell array is incorporated into the second window pane.

73. The window of claim 71, wherein at least a portion of light incident on the microcell array undergoes total internal reflection.

74. The window of claim 71, wherein the microcell array comprises a first material and second material.

75. The window of claim 74, wherein the first material and the second material have different indices of refraction.

76. The window of claim 71, wherein the microcell array comprises a plurality of microcell elements and an intercell region.

77. The window of claim 76, wherein the microcell elements comprise a first material and the intercell region comprises a second material.

78. A window comprising:
a first window pane having a first index of refraction;
a second window pane having a second index of refraction;
a diffraction grating comprising:
an electro-optic material positioned between the first and second window panes;
a counter electrode; and
a two-dimensional array of signal electrode elements;
wherein the electro-optic material is provided between the counter electrode and the two-dimensional array of signal electrode elements such that voltages applied between the counter electrode and the signal electrode elements provide a selected spatial distribution of refractive indices to the electro-optic material; and
a total internal reflection layer positioned such that the second window pane is positioned between the diffraction grating and the total internal reflection layer.

79. The window of claim 78, wherein at least a portion of light incident on the total internal reflection layer undergoes total internal reflection.

80. A window comprising:
a first window pane having a first index of refraction;
a second window pane having a second index of refraction; and
a diffraction grating comprising:
an electro-optic material positioned between the first and second window panes;
a counter electrode; and
a two-dimensional array of signal electrode elements;
wherein the electro-optic material is provided between the counter electrode and the two-dimensional array of signal electrode elements such that voltages applied between the counter electrode and the signal electrode elements provide a selected spatial distribution of refractive indices to the electro-optic material, and wherein the counter electrode or the array of signal electrode elements comprises a UV blocking layer.

* * * * *